June 18, 1963 P. J. HESS ETAL 3,094,298
VTO FAN MODULATING STRUCTURE
Filed May 28, 1962
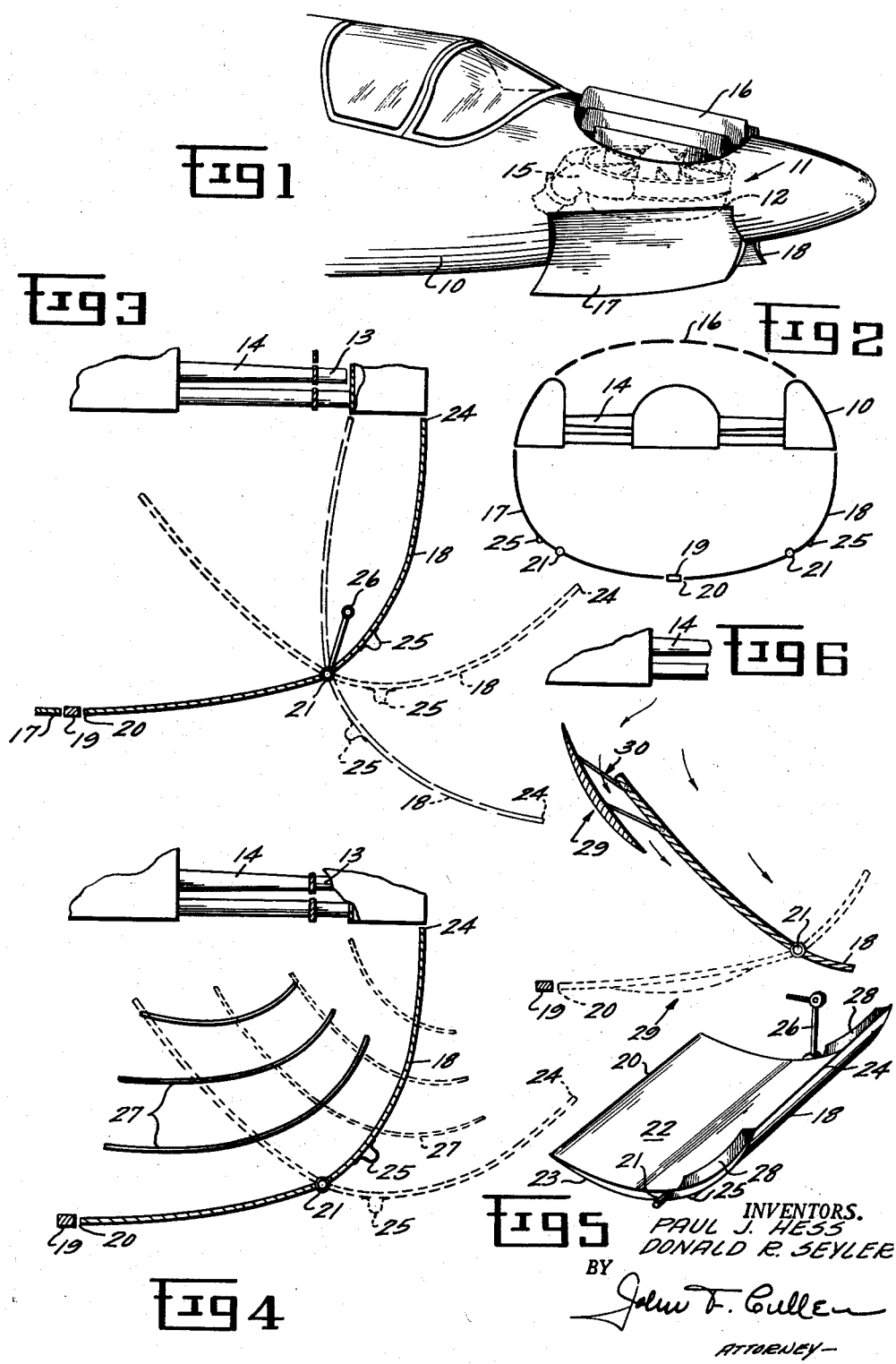
INVENTORS.
PAUL J. HESS
DONALD R. SEYLER
BY
John F. Cullen
ATTORNEY Patented June 18, 1963

3,094,298
VTO FAN MODULATING STRUCTURE
Paul J. Hess and Donald R. Seyler, Cincinnati, Ohio, assignors to General Electric Company, a corporation of New York
Filed May 28, 1962, Ser. No. 198,315
12 Claims. (Cl. 244—23)

The present invention relates to a VTO fan modulating structure and, more particularly, to a diverter structure that is a thrust modulating system as it is used on a trim or control fan in the fuselage of an aircraft of the vertical rising type.

One of the systems for VTOL aircraft—which are known as vertical take-off and landing aircraft—is the lift fan system. In this system large fans of the tip turbine type may be buried in the wings or in the fuselage and are designed to move large quantities of relatively low velocity air in a vertical direction providing lifting thrust on the aircraft. During the hovering or vertical lift portion of the mission, as well as the transition portion in which the aircraft is moving into the horizontal part of the flight at which time straight jet reaction power plants may take over, it is vitally necessary to provide trim and control power to maintain the level attitude of the aircraft. Generally, the center of gravity of the aircraft does not coincide with the resultant line of lift so that a moment tending to pitch the aircraft is created during the lifting portion. Additionally, some provision must be made for balancing the aircraft statically due to payloads or other loading considerations as well as providing compensation for gusts that may tend to pitch the aircraft up or down when it is airborne.

Typical requirements for the trim and control fan which, for purposes of illustration only, will be treated herein as an extra fan in the nose of the fuselage, demand that the nose fan provide both positive and negative lift for compensation in maintaining the proper attitude of the aircraft.

Normally, the trim or control fan, which will hereinafter be referred to as the nose fan, is a fan with a fixed geometry and a fixed amount of power going into it. This is satisfactory for positive lift where the fan can be designed for the maximum lift condition but a problem occurs in trying to get the fan to operate at the same level of power input and produce a negative lift. It is desirable to operate the fan at a constant level of power for simplicity which for unstalled operation of the fan results in substantially constant speed on the fan. Obviously, the lift of the fan may be spoiled but it must not be done in a manner that tends to stall the fan to create mechanical or aerodynamic problems on the fan. If the fan is not operated at constant power it means that the power going to the fan must be directed somewhere else and the exhaust gas normally passing through the turbine driving the fan under maximum conditions must be dumped overboard or otherwise disposed of. While this can be done it requires extra control mechanism to direct the air into a bypass ducting of some sort to dispose of it. Thus, the mechanical complexity and the control complexity increases because other factors must then be varied. It can be seen that even stopping the fan will not provide the negative lift normally required. It is therefore necessary to provide a thrust modulating arrangement that permits the fan to operate at substantially constant power and speed and obviates the problem of fan stall when the lift is modulated. Therefore a system is required that will permit the thrust to vary from maximum lift to a negative lift with the fan characteristics just described.

The main object of the present invention is to provide a fan diverter or modulating structure which can vary the thrust from a maximum positive position to a negative position at substantially constant power input and fan speed and avoids stalling the fan.

Another object is to provide a system which has a very small time constant in modulating the thrust from positive to negative.

A further object is to provide such a system which uses part of the aircraft structure for the thrust modulation.

Briefly stated, the invention provides a fan modulating or diverter structure for installation in an aircraft fuselage of the type that has a vertically mounted fan in the duct for vertical air movement to provide lift. The modulating structure comprises a pair of one piece doors, similar to bomb bay doors, that are symmetrically disposed about the fuselage longitudinal centerline, and the doors are shaped to form part of the fuselage in closed position. Each door is pivoted on a longitudinal pivot that is substantially at the center of pressure of the door and vertically below the outer periphery of the fan. Means are provided to rotate the doors about the pivots so that the doors are reversed to intercept the fan airflow and guide it along the inner curved surface into an overboard and reverse direction. The doors are further rotated to an extreme open position to form a continuation of the fan duct and guide the air along the outer surface of the doors when maximum lift is desired.

While the specification concludes with claims particularly pointing out and distinctly claiming the subject matter which we regard as our invention, it is believed the invention will be better understood from the following description taken in connection with the accompanying drawing in which:

FIGURE 1 is a partial perspective of the fan modulating structure in an intermediate position on a nose of an aircraft;

FIGURE 2 is a diagrammatical cross section showing the doors in the closed position forming part of the fuselage;

FIGURE 3 is a partial cross section through one of the doors illustrating several positions;

FIGURE 4 is a view similar to FIGURE 3 showing additional spaced directing vanes parallel to the door in a modified form;

FIGURE 5 is a perspective view of a single door showing end fences for confining the flow; and FIGURE 6 is a part section view of a single door showing a modification thereto.

Referring first to FIGURE 1 there is shown the nose section of a typical aircraft in which the fan modulating structure of the invention may be used. While shown in the nose section because of its desirable characteristics with a pitch and control fan, such as a nose fan, it should be understood that the invention may be used in any fan arrangement having depth sufficient for the modulating structure including ducted propellers, but will herein be described in connection with the nose fan for simplicity only. The aircraft has a fuselage 10 in the nose of which a vertically mounted fan generally indicated at 11 is disposed in a duct 12 to move air vertically through the fuselage to provide lift on the aircraft. The fan may be of the tip turbine type in which turbine buckets 13 (FIGURE 3) are peripherally mounted on the ends of fan blades 14 in a known manner and the fan is driven by exhaust gases from a suitable source directed through scroll 15 to drive turbine buckets 13. Suitable louvers 16 may be used at the fan inlet and are opened as shown in FIGURE 1 during vertical lift and closed flush with the fuselage during horizontal flight.

In order to provide continuous modulation of the thrust from fan 11 in the range from maximum positive thrust to maximum reverse thrust and to do this at substantially constant fan power and fan speed, a pair of doors 17 and 18 is provided. The doors are preferably one piece for simplicity. Referring next to FIGURE 2 it can be seen that the doors are symmetrically disposed about the fuselage longiutdinal centerline and are shaped to fair smoothly into the fuselage 10 and form part of the fuselage when in the closed position as shown. An additional strut 19 at the centerline provides for rigidity of the fuselage at the opening and extends lengthwise of the opening and the door leading edge 20 abuts the strut in the closed position of the door.

A complete and continuous modulation of the thrust of fan 11 is obtainable by the instant invention. Referring to FIGURE 3, it can be seen that each door is mounted on a longitudinal pivot 21 that extends into the fuselage at each end of the door. The door is thus rotatable about the pivot. The pivot 21 is particularly located in order to simplify the operation. In order to keep down the moment required to operate the doors the pivot is disposed substantially at the center of pressure of the door which is essentially the line of action of the resultant integrated air pressure forces on the door inner surface. Additionally, the pivot is disposed substantially below the outer periphery of the fan 14 including the turbine buckets 13 as clearly shown in FIGURE 3. Furthermore, in order to allow clearance, the pivot 21 is located below the fan at least the distance from the door leading edge 20 to the pivot which, as illustrated, is substantially the distance from the longitudinal centerline to the pivot.

As previously stated, the characteristics require that the modulating structure must go from a positive to negative thrust in order to fulfill the mission requirements. Furthermore, it is desirable to do this at substantially constant fan power and speed, thus, with no stalling of the fan. Furthermore, the structure must modulate very rapidly so that the time constant from full thrust to reverse thrust is kept as small as possible. The modulating structure meets these requirements. FIGURE 3 shows the door in the closed or solid line position, in an intermediate or dotted line position, and at the extreme open broken line position. It can be seen that the location of pivot 21 above the strut 19 would permit leading edge 20 to swing inwardly as the door is rotated from the closed to the open position. Thus, the doors are shortened to abut strut 19 and prevent jamming when the leading edge 20 is rotated into the fan airflow to the open position.

Reference to FIGURE 5 shows that the door may conveniently be made in an airfoil shape for structural rigidity and this includes the sharp leading edge 20 as shown in this figure. Additionally, the airfoil shape, while not essential, provides the smooth inner surface 22 and outer surface 23 for the flow thereover as will later be explained. A sharp leading edge 20 provides a greater restriction to flow between the door leading edges in the intermediate positions, forcing more flow along the inner surfaces of the doors.

It can be seen in FIGURE 3 that, as the door is rotated from the solid closed position to the broken line extreme open position that, at the intermediate positions, one of which is shown, the door intercepts a portion of the airflow downwardly from the fan and diverts it outwardly and upwardly as determined by the door curvature. In the particular arrangement shown the door curvature is sharper from pivot 21 to the trailing edge 24 in order to obtain the maximum vertical thrust at the most favorable position. It will also be noted that as the door is turned into the reverse thrust position the fan tends to be throttled. The throttling, depending upon the characteristics of the fan, can be serious enough to stall the fan. When stall occurs the fan flow and efficiency and pressure-rise may drop rapidly. It can be seen that at no time is the fan completely closed off because of the substantially circular duct 12 being closed off by rectangular doors 17 and 18. In other words, at the forward and aft portion of the fan, as shown in FIGURE 1, the doors can never intercept the complete fan flow. Thus, it is possible, with the modulating structure, to allow some flow through the fan at all times except in closed position. This permits the door to open completely and intercept varying quantities of airflow without ever stalling the fan. In the extreme open position, as shown in FIGURE 3, the outer surface 23 of the door forms an extension of the duct exhausting the air downwardly to permit full thrust with little or no restriction. Thus, an infinitely modulated thrust is obtainable with the structure with substantially constant power input and fan speed which is desired for minimum system complexity. By preventing the stalling of the fan it is possible to obtain the negative thrust operation almost instantaneously without overspeeding the fan. The open passage at the forward and aft end of the fan not completely intercepted by the doors provides relief necessary for the fan to keep it from stalling.

Because of the tendency of air to follow a curved surface up to a given point it is desired to break the air away from the outer surface of the door at the extreme open door position. To this end a tripping device such as a longitudinal rib 25 is provided as shown below the pivot when the door is in the extreme open position. The rib forces the air to break away and continue downwardly at substantially the same area that it left the fan.

It can be seen that the airflow across the door is across both surfaces during the operation of the modulating structure. During the air intercepting position the air flows over the smooth inner surface of the door and in the extreme open position flows over the outer surface of the door. Thus, there are an infinite number of setting points for complete thrust modulation by a simple, one-piece movable structure that also forms part of the fuselage when in the closed position. Furthermore, the system is a completely subcritical system in that none of the discharge passages are ever choked and are all capable of delivering higher flow if the fan speed is increased although such increase is not necessary for the reasons given above with respect to stalling. The entire range of the continuous thrust modulation from maximum to reverse is obtainable by turning the doors a small amount as shown in the intermediate position in FIGURE 3.

Any suitable actuating mechanism such as a link 26 passing through the pivot may be used to actuate the doors and a single actuator is thus all that is required.

It is possible that, under some circumstances, the airflow from the fan may tend to "pack down" on the outer portion of the door in the intermediate position and create a back pressure on the fan due to the throttling that could occur. To remedy this, it may be desirable to include additional spaced directing vanes 27 suitably supported on the door between the door and the fan above the pivot in order to channel the air into the reverse direction. If the squeezing down is not objectionable to the fan the vanes need not be used. The vanes are arranged as shown in FIGURE 4 substantially parallel to the door curvature in order to form channels for the air to follow. It can be seen that when the door is in the reverse thrust position, as shown by the intermediate dotted position in FIGURE 3, the air channeled out from the fan may tend to spill over the edge of the doors and the vertical component of thrust of such air will be lost. To avoid this, a fence 28 is provided at the end of each door perpendicular to the door surface and the longitudinal centerline in order to confine the diverted airflow and prevent its spilling over the door ends.

If it is found that increased reverse thrust is desired, it is possible to extend the air intercepting capability of each door in a number of ways such as by a suitable actuating mechanism operating an additional flap 29 or its equivalent as shown in FIGURE 6. The flap, which may be attached to the door, cooperates with the door and intercepts more fan air and directs it outwardly. Of course, it would be retracted by links 30 to be flush with the door 18 in the closed and extreme open positions.

The modulating structure just described provides doors that are completely rotated to a reverse position and provides an infinite number of settings without stalling the fan to permit operation at substantially constant power and speed.

While we have hereinbefore described preferred forms of our invention, obviously modifications and variations of the present invention are possible in the light of the above teachings. It is therefore to be understood that within the scope of the appended claims, the invention may be practiced otherwise than as specifically described.

We claim:
1. VTO fan modulating structure for an aircraft having a vertically mounted fan in a duct therein for movement of air vertically therethrough to provide lift, said structure comprising;
   a pair of doors symmetrically disposed about the fuselage longitudinal centerline,
   said doors being shaped to fair into said aircraft and be a part thereof in closed position,
   each of said doors having a longitudinal pivot disposed substantially at the center of pressure of the door and vertically below the outer periphery of the fan substantially the distance from the longitudinal centerline to the pivot,
   and means to rotate said doors to open about said pivots to intercept fan airflow and guide it along the door inner surface and divert it into a reverse direction,
   said doors being rotatable to an extreme open position to form a continuation of said duct and guide the air along the outer surface of said doors.
2. Apparatus as described in claim 1 having,
   a fence at each end of each door perpendicular to the door surface and the longitudinal centerline to confine the diverted airflow and prevent spillage over the door ends.
3. Apparatus as described in claim 1 having,
   longitudinally-extending rib means on the outer surface of each door below the pivot in the extreme open position.
4. Apparatus as described in claim 1 having,
   a fence at each end of each door perpendicular to the door surface and the longitudinal centerline to confine the diverted airflow and prevent spillage over the door ends and,
   longitudinally-extending rib means on the outer surface of each door below the pivot in the extreme open position.
5. Apparatus as described in claim 1 having,
   a plurality of spaced directing vanes generally parallel to the door and disposed between each door and the fan above the pivot in the air intercepting position to channel said air into the reverse direction.
6. Apparatus as described in claim 1 having means cooperative with said doors to extend their air intercepting capability.
7. VTO fan modulating structure for an aircraft fuselage having a vertically mounted fan in a duct therein for movement of air vertically therethrough to provide lift, said structure comprising;
   a pair of one piece doors symmetrically disposed about the fuselage longitudinal centerline and meeting at the inner leading edge and shaped to fair into said fuselage and be a part thereof in closed position,
   a longitudinal pivot disposed for each door substantially, at the center of pressure of the door, vertically below the outer periphery of the fan and, below the fan half the door width,
   each said door having a lesser curvature between said pivot and leading edge and sharper curvature between said pivot and opposite trailing edge,
   and means to open said doors by rotation of said leading edge into the airflow about said pivot to intercept fan airflow and guide it along the door inner surface and divert it in a reverse direction,
   said doors being rotatable to an extreme open position with said leading edges at the fan periphery to form a continuation of said duct and guide the air along the outer surface of said doors.
8. Apparatus as defined in claim 7 in which the leading edge is a sharpe edge.
9. Apparatus as described in claim 7 having,
   a fence at each end of each door perpendicular to the door surface and the longitudinal centerline to confine the diverted airflow and prevent spillage over the door ends.
10. Apparatus as described in claim 7 having,
   longitudinally-extending rib means on the outer surface of each door between the pivot and trailing edge.
11. Apparatus as described in claim 7 having,
   a fence at each end of each door perpendicular to the door surface and the longitudinal centerline to confine the diverted airflow and prevent spillage over the door ends and,
   longitudinally-extending rib means on the outer surface of each door between the pivot and trailing edge.
12. Apparatus as described in claim 7 having,
   a plurality of spaced directing vanes generally parallel to the door and disposed between each door and the fan above the pivot in the air intercepting position to channel said air into the reverse direction.

References Cited in the file of this patent
UNITED STATES PATENTS
2,019,600    Peek _____ Feb. 6, 1962